(12) United States Patent
Guillaume et al.

(10) Patent No.: US 8,657,234 B2
(45) Date of Patent: Feb. 25, 2014

(54) DUAL FUNCTION DOOR FOR AN AIRCRAFT ENGINE NACELLE

(75) Inventors: Pierre Guillaume, Toulouse (FR); Patrick Lair, Lasserre (FR)

(73) Assignees: Airbus Operations S.A.S., Toulouse (FR); Airbus, Blagnac (FR)

( * ) Notice: Subject to any disclaimer, the term of this patent is extended or adjusted under 35 U.S.C. 154(b) by 544 days.

(21) Appl. No.: 13/152,986

(22) Filed: Jun. 3, 2011

(65) Prior Publication Data

US 2011/0297787 A1 Dec. 8, 2011

(30) Foreign Application Priority Data

Jun. 4, 2010 (FR) ...................................... 10 54414

(51) Int. Cl.
*B64D 29/00* (2006.01)
*B64C 1/14* (2006.01)
(52) U.S. Cl.
USPC .......................... 244/129.4; 244/53 R; 49/141
(58) Field of Classification Search
USPC .............. 244/53 R, 129.4, 129.5; 49/31, 141; 292/92; 296/224
See application file for complete search history.

(56) References Cited

U.S. PATENT DOCUMENTS

| | | | |
|---|---|---|---|
| 4,232,513 A | 11/1980 | Pearson et al. | |
| 4,825,644 A | 5/1989 | Bubello et al. | |
| 4,899,960 A * | 2/1990 | Hararat-Tehrani et al. | 244/118.5 |
| 5,623,820 A | 4/1997 | Balzer et al. | |
| 5,704,207 A | 1/1998 | Jensen et al. | |
| 6,702,232 B2 * | 3/2004 | Dovey et al. | 244/129.4 |
| 7,097,240 B2 * | 8/2006 | Kurtz et al. | 296/218 |
| 7,578,475 B2 * | 8/2009 | Pratt et al. | 244/129.4 |
| 2006/0162338 A1 | 7/2006 | Prociw et al. | |

FOREIGN PATENT DOCUMENTS

| | | |
|---|---|---|
| EP | 1 691 035 A2 | 8/2006 |
| EP | 1 691 035 A3 | 8/2006 |
| FR | 2 406 729 | 5/1979 |
| FR | 2 623 250 | 5/1989 |
| FR | 2 920 134 | 2/2009 |

OTHER PUBLICATIONS

French Search Report issued on Mar. 2, 2011 in the corresponding French Application No.: 1054414 (with English Translation of Category of Cited Documents).

* cited by examiner

*Primary Examiner* — Rob Swiatek
(74) *Attorney, Agent, or Firm* — Oblon, Spivak, McClelland, Maier & Neustadt, L.L.P.

(57) ABSTRACT

A door for an aircraft engine nacelle, comprising an opening leaf, locking device with which the opening leaf may be locked in the closed position, as well a device for setting the opening leaf into motion with which the latter may be displaced from the closed position to the open position. The locking device has a mechanical fuse intended to break under the effect of a force exerted by the opening leaf and resulting from an opening gas pressure being applied on the opening leaf, with a value greater than or equal to a predetermined value and causing displacement of the opening leaf from the closed position to the open position after breakage of the mechanical fuse.

10 Claims, 5 Drawing Sheets

DUAL FUNCTION DOOR FOR AN AIRCRAFT ENGINE NACELLE

TECHNICAL FIELD

The present invention relates to a door for an aircraft engine nacelle, preferably intended to be implanted on a mobile cowl of the nacelle.

The invention applies to nacelles which may house any types of engines, in particular ducted-fan jet turbine engines.

STATE OF THE PRIOR ART

In a known way, a nacelle surrounds an aircraft engine so as to form aerodynamic fairing around this engine. It comprises fixed elements and mobile elements, the latter being called nacelle cowls, and generally jointedly mounted on the pylon for attaching the engine.

The nacelle interiorly defines a housing in which the engine provided with its equipment/accessories is laid out, the portion of this housing located at right angles to the combustion chamber being usually called the engine compartment. Upon stopping this engine, after a period of operation, hot air may accumulate in the space of the engine compartment left free between the nacelle and this same engine. In order to cope with this detrimental effect, a so-called "soak back" effect, provision may be made for specific means equipping the nacelle, allowing hot air to be discharged out of the engine compartment. With this, it is possible to limit the thermal stresses of the engine, of its equipment, and of the nacelle elements.

Moreover, the nacelle is equipped with specific means allowing limitation of the risks of deterioration which may occur following the bursting of a pressurized gas conduit, in the engine compartment. The specific means generally assume here the form of one or several overpressure doors, allowing, during their opening, discharge of the overpressurized gases out of the engine compartment.

If the design described above is widespread, it remains nevertheless complex, in particular due to the requirement of providing distinct specific means for respectively dealing with the thermal stress problems, and overpressure problems.

SUMMARY OF THE INVENTION

The object of the invention is therefore to at least partly find a remedy to the drawbacks mentioned above, relating to the embodiments of the prior art.

To do this, the object of the invention first of all is a door for an aircraft engine nacelle, comprising an opening leaf designed so as to be able to occupy a closed position and an open position, said door comprising locking means with which the opening leaf may be locked in the closed position, as well as means for setting the opening leaf into motion allowing the latter to be moved from its closed position to the open position when the locking means are disabled.

According to the invention, said locking means have a mechanical fuse intended to break under the effect of a force exerted by the opening leaf and resulting from an opening gas pressure being applied on the opening leaf, with a value greater than or equal to a predetermined value and causing displacement of said opening leaf from the closed position to the open position after failure of said mechanical fuse.

The invention is remarkable in that by means of a same door, it provides an answer to thermal stress and overpressure problems. Indeed, the hot air confined between the engine at a standstill and the nacelle may be discharged by bringing the opening leaf of the door into the open position, via disabling of the locking means, and then preferably automatic enabling of the means for setting the opening leaf into motion. Further, when gases are found overpressurized with a level deemed unacceptable between the engine and the nacelle, for example following the bursting of a conduit, these gases may also be discharged through the same door. Actually, this opening pressure which is applied on the opening leaf of the door, and which reaches or exceeds said predetermined value, urges this opening leaf to exert a force leading to the breakage of the mechanical fuse with which the locking means are equipped. Not being at this stage maintained any longer in the closed position by the locking means degraded by the breakage of the fuse, the opening leaf of the door is then displaced towards the open position under the effect of this same opening pressure, a position in which the overpressurized gases may naturally be discharged through the door.

Such a door includes a door frame which may be directly formed by the structure of the nacelle on which the opening leaf has to be implanted, or else may alternatively be formed by a specific element forming a frame, intended to be added onto the structure of the nacelle. In the latter case, the door according to the invention has the advantage of being able to appear in the form of a line replaceable piece of equipment (Line Replaceable Unit).

The door according to the invention may be implanted in any location deemed to be suitable for the nacelle, on a fixed or mobile element of the latter, and preferentially on one or several of the nacelle elements delimiting the engine compartment dedicated to housing the equipment.

The number of doors according to the invention which equip a nacelle may vary depending on the encountered needs and constraints. Moreover, the nacelle may further incorporate other conventional means, known to the person skilled in the art, with which the thermal stress problems or gas overpressure problems may be handled.

Preferably, the door is designed so that the opening leaf may be moved from the open position to the closed position under the effect of a closing gas pressure which is applied on the opening leaf. This closing gas pressure may in particular be applied by the secondary flow of the engine, when the latter assumes the form of a ducted-fan jet turbine engine. Alternatively, closing of the opening leaf may be performed with conventional controlled means, for example those also being used for ensuring the opening of the opening leaf. The retained preferential solution nevertheless has the advantage of getting rid of risks of failure of the control means, since the closing is carried out by having a gas flow simply pass over the outer surface of the opening leaf, leading to the shutting of the latter.

Preferably, the door is designed so that the opening leaf is automatically locked by the locking means when it reaches the closed position, during its displacement from the open position to the closed position. Advantageously, it is therefore not necessary to control the locking means in order to achieve locking of the opening leaf reaching the closed position, this operation being performed automatically.

Preferably, as mentioned above, the means for setting the opening leaf into motion are designed in order to generate automatic displacement of the latter from the closed position to the open position, when the locking means are disabled. This may for example be one or several springs with which the hinges of the opening leaf are equipped, in the preferential case when this opening leaf is pivotally mounted on the door frame, by means of these hinges.

Preferably, the locking means allowing the opening leaf to be locked in the closed position are designed so as to be electrically controlled so as to alternately adopt an enabled configuration and a disabled configuration. This may for example be at least one solenoid valve with a mobile output shaft, fulfilling the function of a bolt.

Preferably, this mobile output shaft integrates said mechanical fuse and has a beveled free end, both of these features may nevertheless be provided one without the other. The latter feature allows the opening leaf to be automatically locked upon its displacement from the open position to the closed position, without being hindered by the mobile output shaft capable of retracting temporarily under the effect of the force exerted by the opening leaf and/or the face plate of the locking means on the beveled end of the shaft, during the closing of the opening leaf.

The object of the invention is also a nacelle element, preferably a mobile nacelle cowl, comprising at least one door as described above. Preferably this is a mobile cowl of a thrust inverter. Alternatively, this may for example be a mobile fan cowl.

Preferably, the nacelle element comprises an inner structure and an outer structure between which the secondary flow of the engine is intended to circulate, said door being laid out on said inner structure. As mentioned above, this gives the possibility of using the secondary flow of the jet turbine engine for exerting said closing gas pressure aiming at displacing the opening leaf from the open position to the closed position, without requiring any specific action on behalf of the operator.

Finally, the object of the invention is an aircraft comprising at least one engine assembly including an engine as well as a nacelle laid out around the engine, said nacelle comprising at least one nacelle element as described above.

Other advantages and features of the invention will become apparent in the non-limiting detailed description below.

BRIEF DESCRIPTION OF THE DRAWINGS

This description will be made with reference to the appended drawings wherein.

DETAILED DESCRIPTION OF PARTICULAR EMBODIMENTS

Figure 1:
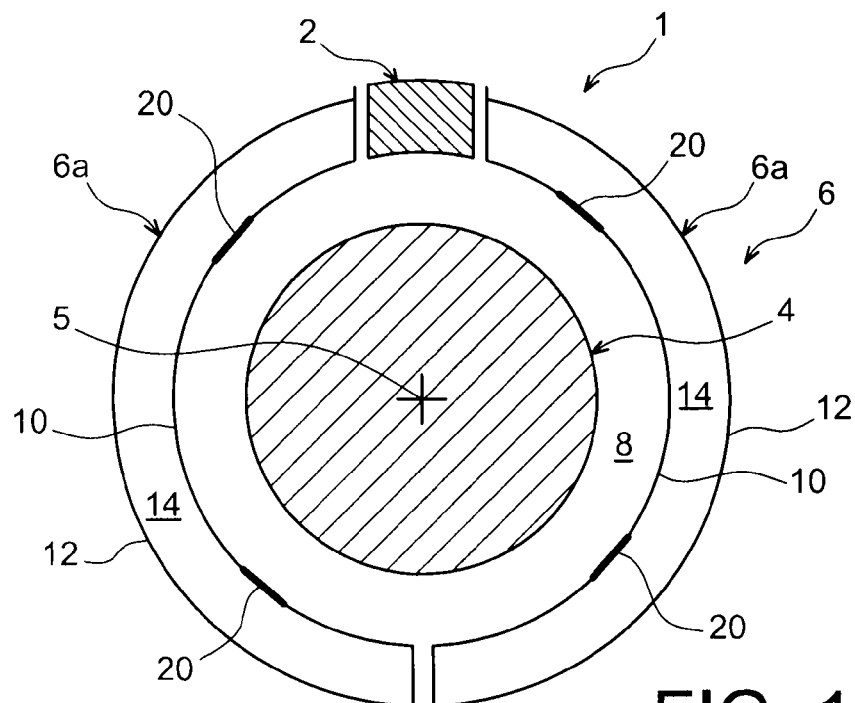
FIG. 1 illustrates a schematic sectional view of an engine assembly for an aircraft, comprising a nacelle equipped with two mobile cowls each integrating doors according to a preferred embodiment of the present invention.

With reference to FIG. 1, an aircraft engine assembly 1 is seen, intended to be attached under a wing/aerofoil of this aircraft, this assembly 1 including an attachment pylon 2, a ducted-fan jet turbine engine 4, as well as a nacelle 6 surrounding the jet turbine engine 4 of longitudinal axis 5.

In FIG. 1, the engine assembly is illustrated in a sectional view passing through the engine compartment 8 located at right angles to the combustion chamber of the jet turbine engine, this engine compartment 8 being conventionally delimited axially between the fan and the case for ejecting the gases from the jet turbine engine, and radially between the nacelle 6 and the central case of the jet turbine engine. This compartment 8 is used for housing equipment/accessories of the engine.

In the illustrated sectional view, the nacelle 6 assumes the shape of two mobile nacelle cowls 6a, which are thrust inverter mobile cowls. Each of these cowls 6a assume the general shape of a half cylinder centered on the axis 5, the upper end of which is pivotally mounted on the attachment pylon 2.

Figure 2:
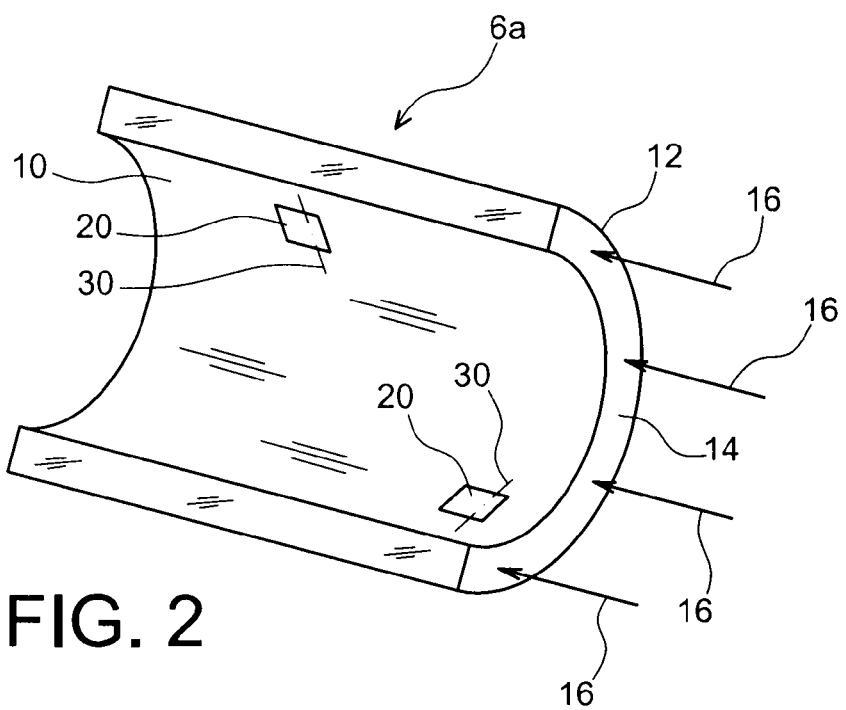
FIG. 2 illustrates a schematic perspective view of one of the two mobile nacelle cowls shown in FIG. 1.

With joint reference to FIGS. 1 and 2, each mobile nacelle cowl 6a comprises an inner structure 10, a so-called IFS (Inner Fan Structure), and an outer structure 12, a so-called OFS (Outer Fan Structure), between which is defined a radial space 14 crossed by the annular secondary flow of the jet turbine engine, schematized by the arrow 16 in FIG. 2.

In this respect, it is indicated that it is the inner structure 10 which radially delimits the engine compartment 8. It is also this inner structure 10 on which is laid out at least one door 20 according to the invention. Here, two doors 20 have been illustrated schematically each fitting out two mobile cowls 6a, both doors 20 fitting out a same inner structure 10 being shifted relatively to each other along the height, and optionally also along the axial direction, as this was schematized in FIG. 2. It is nevertheless specified that the number of doors 20 fitting out each inner structure 10 of a nacelle cowl may vary depending on the encountered needs and constraints.

Figure 3A:
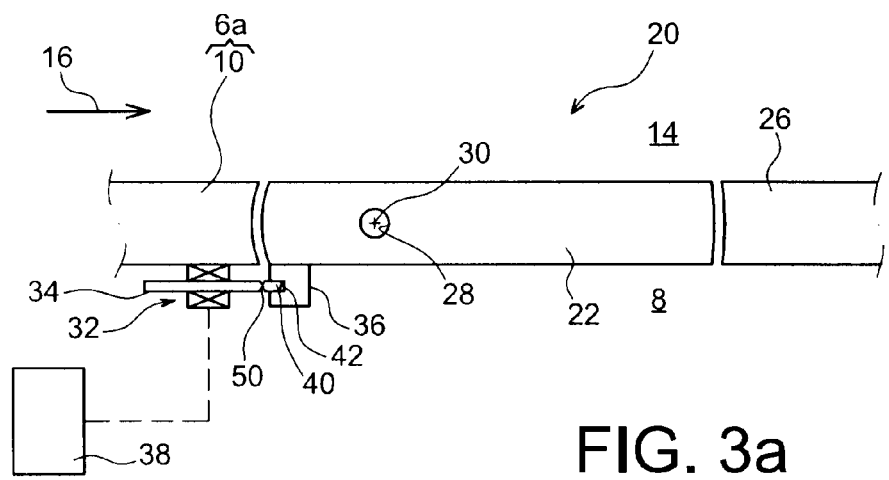
FIGS. 3a-3e illustrate schematic views of one of the doors shown in the previous figures, in different states successively adopted after stopping the engine.

FIG. 3a shows in more detail one of the two doors 20, which appears as a preferred embodiment of the present invention. Naturally, the other door 20 fitting out the nacelle cowl inner structure 10 has a design which is identical with or similar to the one which will now be detailed.

The door 20 comprises an opening leaf 22, with a globally square or rectangular shape, pivotally mounted on a door frame 26 directly formed here by an aperture in the inner structure 10 of the nacelle cowl 6a.

This assembly is carried out by means of hinges/pins 28 connecting the opening leaf 22 to the frame 26, these hinges 28 thereby defining a joint axis 30 of the opening leaf 22 with respect to the inner structure 10. The joint axis 30 is off-centered so as to be located closer to the upstream end of the opening leaf 22 than to its downstream end, in relation with the direction of flow 16 of the secondary annular flow following the outer surface of the opening leaf 22, and that of the inner structure 10. Further, this axis 30 is locally orthogonal to the secondary flow 16.

The door 20 comprises locking means with which the opening leaf 22 may be locked in the closed position, as shown in FIG. 3a. In this position, the opening leaf 20 ensures aerodynamic continuity of the inner structure 10, in order to at best limit the perturbations of the secondary flow which follows them.

The locking means are designed here so as to be electrically controlled in order to alternately adopt an enabled configuration or a disabled configuration. They comprise a solenoid valve 32 with a mobile output shaft 34, fulfilling the function of a bolt. This mobile output shaft 34 is either formed by the iron core of the solenoid valve, or is firmly secured to the latter. The solenoid valve 32 is fixedly added onto the door frame 26, while the locking means moreover comprise a fitting 36 forming a faceplate, firmly secured to an upstream end of the opening leaf 22 and intended to receive the free end of the shaft 34.

The solenoid valve 32 is connected to control means 38 intended for delivering an electric voltage to it or not. When such a voltage is delivered, the output shaft 34 is found in the extracted/deployed position in the downstream direction. Further, when the opening leaf 22 is in the closed position, the downstream end 40 of the deployed shaft 34 is found housed inside the faceplate 42 of the fitting 36, which allows the locking means to be brought into the enabled configuration, in which the opening leaf 22 is maintained/locked in the closed position.

On the other hand, when no voltage is delivered by the control means 38, the output shaft 34 is found in a retracted position in the upstream direction, wherein its output shaft 34 is extracted from the faceplate 42, thereby bringing the locking means into the disabled configuration. In this respect, it is noted that following the cutting off of the electric power supply of the solenoid valve 32, the passing of the shaft 34 from the extracted position to the retracted position is carried out automatically, for example by means of one or several springs.

The mobile output shaft 34 integrates, in proximity to its downstream end 40, a mechanical fuse 50 assuming the form of a section breakage, for example obtained by making a circular groove on this shaft. The purpose of this fuse 50 is to form a preferential breakage area on the portion of the shaft 34 which is found protruding from the coils of the solenoid valve 32, in order to fulfill a function for limiting overpressures, which will be explained hereafter.

Further, the free downstream end 40 of the shaft 34 is beveled, in order to allow automatic locking of the opening leaf 22 upon its displacement from an open position to the closed position, as this will be detailed below.

FIG. 3a therefore shows the opening leaf 22 in the closed position, in which it is locked by the locking means in the enabled configuration. Upon stopping the jet turbine engine on the ground, the heat evolved from the latter leads to heating of the air located in the engine compartment 8. In order to limit thermal stresses of the surrounding elements, the door 20 is advantageously used for discharging this hot air, and this in an automated way. Indeed, the control means of the solenoid valves 32 are designed so as to automatically stop the electric power supply when two conditions are met, the first being the rotational stopping of the rotating elements of the jet turbine engine, and the second being not supplying power to the FADEC (Full Authority Digital Engine Control).

When both of these conditions are met, the control means 38 therefore stop supplying power to the solenoid valve 32, which then sees its output shaft 34 automatically retract into the upstream direction. The locking means thereby adopt the disabled configuration in which they are no longer able to retain the opening leaf in the closed position.

Figure 3B:
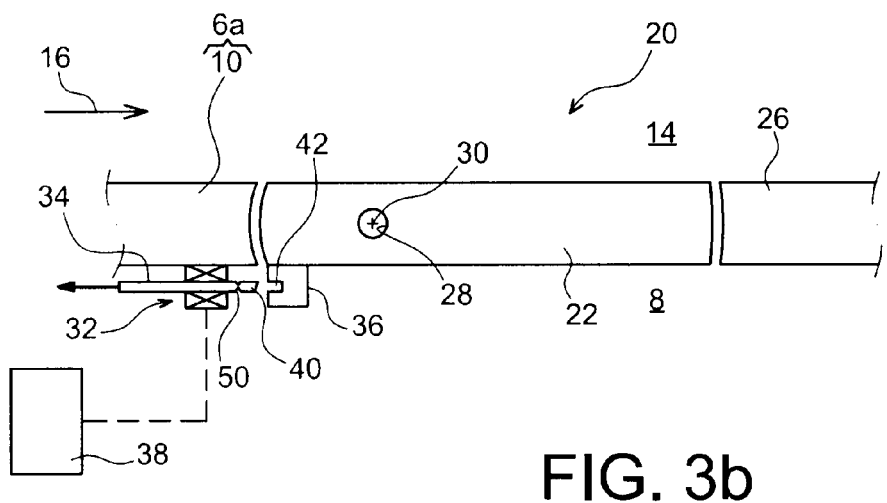
Figure 3C:
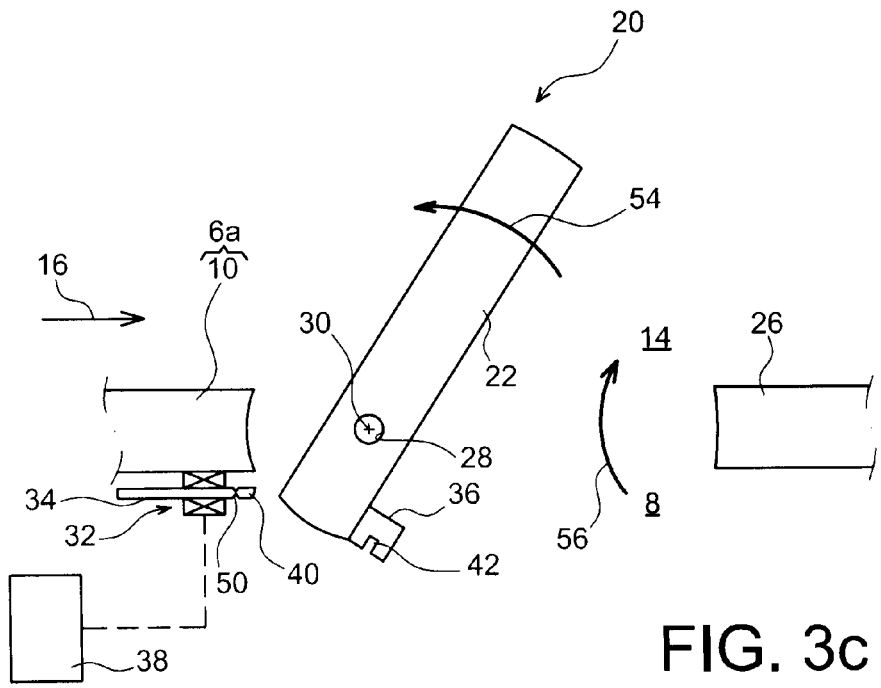

As soon as the opening leaf 22 is unlocked, as schematized in FIG. 3b, means for setting the latter into motion generate its automatic displacement from the closed position to the open position shown in FIG. 3c. The setting into motion of the opening leaf 22, schematized by the arrow 54 in FIG. 3c, is performed for example by means of one or several springs (not shown) integrated to the hinges 28. Once the open position is reached under the effect of the springs, the opening leaf 22 releases the door frame 26 through which the hot air may escape from the engine compartment 8, towards the radial space 14 defined by the mobile nacelle cowl. The discharge of the hot air allowed by the opening of the opening leaf 22 is schematized by the arrow 56 in FIG. 3c.

Before a new flight phase of the aircraft, the opening leaf 22 of the door 20 should be closed. To do this, an automatic solution is also preferred. It consists first of all in supplying power again to the solenoid valve 32, by means of the control means 38. This electrical repowering, which has the consequence of again bringing the output shaft 34 into the extracted position in the downstream direction as shown in FIG. 3d is for example ordered as soon as the jet turbine engine is electrically restarted.

This restarting causes the secondary flow to again circulate in the radial space 14 of the mobile nacelle cowl, with the consequence of applying a closing gas pressure on the outer surface of the opening leaf 22 protruding into this space 14. The design is retained so that this gas pressure delivered by the secondary flow 16 surmounts the force generated by the springs integrated to the hinges 28, then involving automatic closing of the opening leaf 22 by simple gas pressure leading to the shutting of the latter.

Figure 3D:
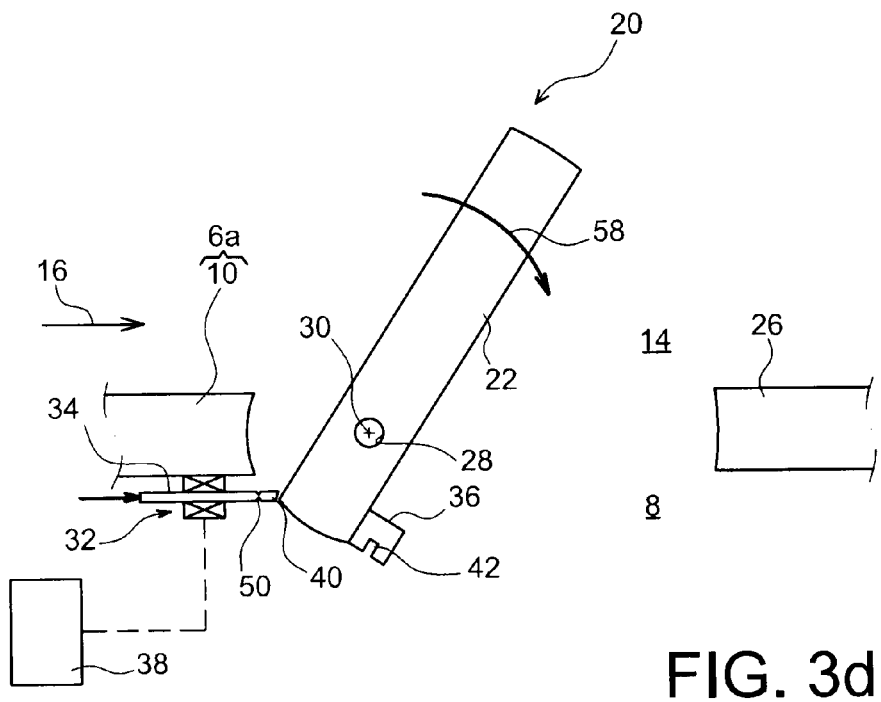
Figure 3E:
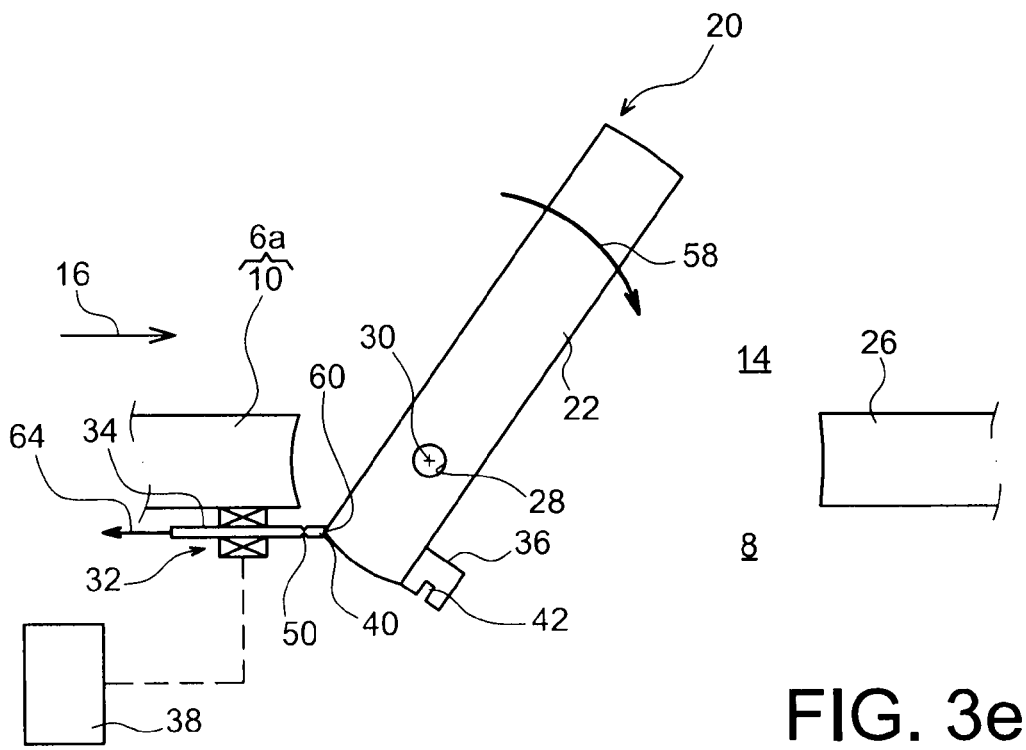

The setting into motion of the opening leaf 22 towards its closed position, schematized by the arrow 58 in FIG. 3d, is performed without any obstacle during the initial phase of this movement. On the other hand, as this was shown in FIG. 3e, the upstream end of the opening leaf 22 will rapidly come into contact with the free downstream end 40 of the deployed shaft 34. In order not to block the movement for closing the opening leaf, the free downstream end 40 is beveled, with the purpose of having a beveled surface 60 on which the upstream end of the opening leaf 22 may slide while continuing the closing movement. During this sliding, the contact between the opening leaf and the shaft leads the latter to temporarily and partly retract in the upstream direction, as this was schematized by the arrow 64 of FIG. 3e. This withdrawal of the shaft 34 is therefore carried out by surmounting the electromagnetic force produced by the coils of the solenoid valve 32, which are maintained powered.

Sliding continues on the opening leaf 22 and the fitting 36 until the free downstream end 40 is again found facing the faceplate 42, into which this end 40 inserts automatically by the electromagnetic force.

In this way, the opening leaf 22 is found automatically locked by the locking means when it reaches the closed position shown in FIG. 3a, during its displacement from the open position to the closed position caused by the secondary flow.

The aircraft may then be set into motion with the nacelle doors 20 in the closed position.

The doors 20 may operate in this way after each stopping of the jet turbine engines, in order to deal with the problems of thermal stress. But, advantageously, these doors also fulfill for at least one of them, a function for dealing with the problems of gas overpressure likely to occur in the housing defined interiorly by the nacelle, i.e. here in the engine compartment 8.

Figure 4A:
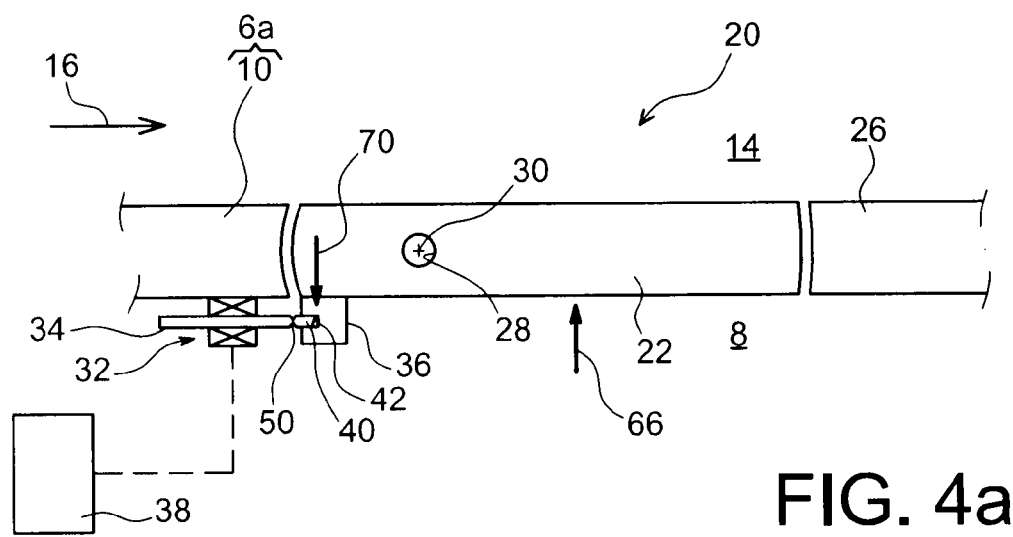
FIGS. 4a and 4b illustrate schematic views of one of the doors shown in FIGS. 1 to 3a in different states successively adopted following abnormal overpressure encountered on the inner surface of the mobile fan cowl provided with the door.
Figure 4B:
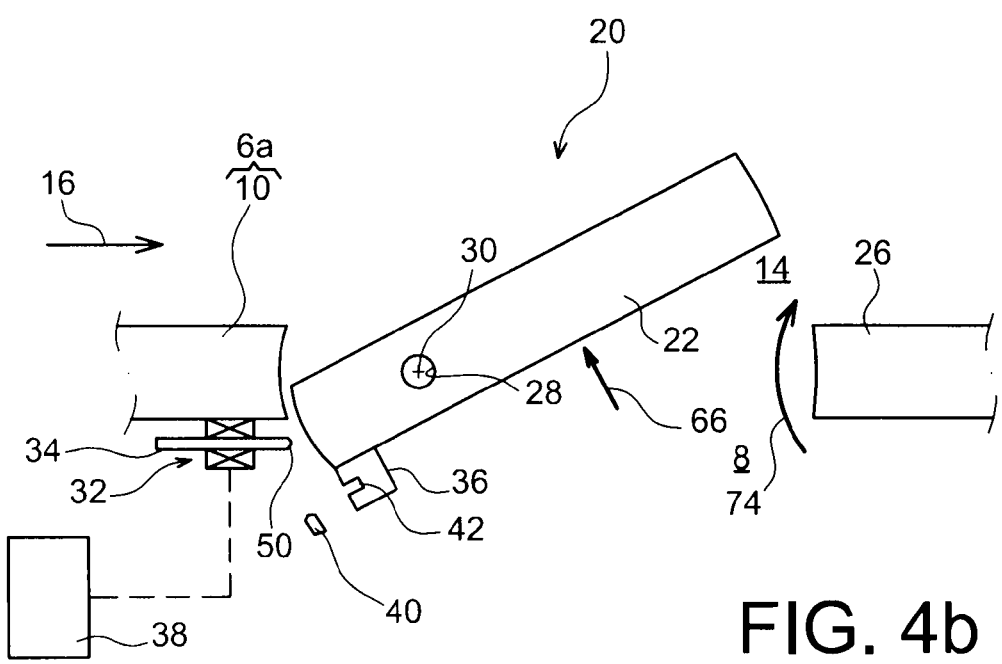

Indeed, when gases are found again in overpressure with a level deemed to be unacceptable in the compartment 8 for example following the bursting of a pressurized gas conduit, these gases are also intended to be discharged through the same door. When such an opening gas pressure is applied on the inner surface of the opening leaf 22, as schematized by the arrow 66 in FIG. 4a, the opening leaf tends to want to pivot around the hinges 28 so as to move towards the open position. The opening leaf 22 then exerts on the fitting 36 of the locking means, a force which this fitting sends back onto the output shaft 34, via the face plate 42. This force, schematized by the arrow 70 in FIG. 4a, leads to the breaking of the mechanical fuse 50 and therefore to the breakage into two pieces of the output shaft 34 of the locking means, as this was schematized in FIG. 4b. At this stage, the opening leaf 22 is therefore no longer held in a closed position by the locking means degraded by the failure of the fuse 50. Therefore, the opening leaf 22 sees itself displaced towards the open position under the effect of this same opening gas pressure 66, a position in which the overpressurized gases may naturally be discharged through the door, as this was schematized by the arrow 74 of FIG. 4*b*.

The predetermined pressure value from which the opening gas pressure 66 will generate failure of the mechanical fuse 50 is determined so that it expresses an abnormal rise in the pressure within the engine compartment 8. This predetermined value may be comprised between 4 and 20 psig, i.e. between about 0.28 and 1.38 bars added to the ambient pressure.

In flight, after evacuation of the overpressurized gases into the space 14 and transported by the secondary flow of the jet turbine engine, this same flow allows the opening leaf 22 to be folded back until the jet turbine engine is shut down on the ground. As this opening is not "reversible", unlike the opening described above produced by controlled disabling of the locking means, these same locking means should then be repaired by a conventional ground maintenance operation.

Of course, various modifications may be made to the invention which has just been described, only as non-limiting examples, by the person skilled in the art.

The invention claimed is:

1. A door for an aircraft engine nacelle, comprising:
   an opening leaf designed so as to be able to occupy a closed position and an open position, said door comprising locking means with which the opening leaf is locked in the closed position, as well as means for setting the opening leaf into motion which moves the opening leaf from the closed position towards the open position when the locking means are disabled,
   wherein said locking means have a mechanical fuse provided in order to break under the effect of a force exerted by the opening leaf and resulting from an opening gas pressure which is applied on the opening leaf, with a value greater than or equal to a predetermined value and causing the displacement of said opening leaf from the closed position to the open position after breakage of said mechanical fuse.

2. The door according to claim 1, wherein the door is designed so that the opening leaf moves from the open position to the closed position under the effect of closing gas pressure which is applied on the opening leaf.

3. The door according to claim 1 or claim 2, wherein the door is designed so that the opening leaf is automatically locked by the locking means when the opening leaf reaches the closed position, during displacement of the opening leaf from the open position to the closed position.

4. The door according to claim 1, wherein the means for setting the opening leaf into motion are designed for generating automatic displacement of the opening leaf from the closed position to the open position, when the locking means are disabled.

5. The door according to claim 1, wherein the locking means with which the opening leaf is locked in the closed position, are designed so as to be electrically controlled in order to alternately adopt an enabled configuration and a disabled configuration.

6. The door according to claim 5, wherein said locking means comprise at least one solenoid valve with a mobile output shaft.

7. The door according to claim 6, wherein said mobile output shaft integrates said mechanical fuse and said mechanical fuse has a beveled free end.

8. A nacelle element, including a mobile nacelle cowl, comprising at least one door according to claim 1.

9. The nacelle element according to claim 8, further comprising:
   an inner structure and an outer structure between which a secondary flow of the engine is intended to circulate, said door being laid out on said inner structure.

10. An aircraft, comprising;
    at least an engine assembly including an engine as well as a nacelle laid out around the engine, said nacelle comprising at least one nacelle element according to claim 8 or claim 9.

* * * * *